United States Patent [19]
Wild et al.

[11] Patent Number: 5,889,203
[45] Date of Patent: Mar. 30, 1999

[54] METHOD FOR DETERMINING THE LOAD SIGNAL OF AN INTERNAL COMBUSTION ENGINE HAVING EXTERNAL EXHAUST-GAS RECIRCULATION

[75] Inventors: Ernst Wild, Oberriexingen; Manfred Pfitz, Vaihingen; Axel Stuber, Tamm, all of Germany

[73] Assignee: Robert Bosch GmbH, Stuttgart, Germany

[21] Appl. No.: 877,798

[22] Filed: Jun. 18, 1997

[30] Foreign Application Priority Data

Jun. 27, 1996 [DE] Germany .................. 196 25 688.7

[51] Int. Cl.[6] .................................................. G01M 15/00
[52] U.S. Cl. .......................................... 73/117.3; 123/571
[58] Field of Search .......................... 73/112, 115, 117.3, 73/116, 117.2, 118.1, 118.2; 123/568, 571

[56] References Cited

U.S. PATENT DOCUMENTS

| | | | |
|---|---|---|---|
| 5,190,017 | 3/1993 | Cullen et al. | 73/117.3 |
| 5,349,936 | 9/1994 | Uchinami | 73/117.3 |
| 5,488,938 | 2/1996 | Ohuchi | 73/117.3 |
| 5,540,091 | 7/1996 | Nakagawa | 73/117.3 |
| 5,577,484 | 11/1996 | Izutani et al. | 73/117.3 |
| 5,653,212 | 8/1997 | Hotta et al. | 123/571 |

FOREIGN PATENT DOCUMENTS 195 28 815   1/1997   Germany .

*Primary Examiner*—Richard Chilcot
*Assistant Examiner*—Eric S. McCall
*Attorney, Agent, or Firm*—Walter Ottesen

[57] ABSTRACT

The invention is directed to a method for determining a load signal of an internal combustion engine having an intake pipe with a pressure sensor, external exhaust-gas recirculation (EGR) and an EGR valve. A load signal (tl) is computed in a circuit arrangement which is proportional to the mass inducted per revolution of the engine. The computation is made in dependence upon measured intake-pipe pressure (ps) and the speed (n) of the engine in rpm. On the one hand, the method makes a simple adaptation possible, while, on the other hand, a correct load signal is formed also in steady-state operation and, in this way, reduced exhaust-gas emissions of the engine are made possible. The exhaust-gas mass flow flowing through the EGR valve is determined by converting the exhaust-gas mass flow into an rpm-dependent signal. The rpm-dependent signal is filtered in a filter simulating charging operations in the intake pipe. A corrective signal (scorr) proportional to the exhaust-gas mass inducted by the engine per revolution thereof is determined and this corrective signal (scorr) is subtracted from the load signal (tl) to generate and output the corrected load signal (tlcorr).

8 Claims, 2 Drawing Sheets

METHOD FOR DETERMINING THE LOAD SIGNAL OF AN INTERNAL COMBUSTION ENGINE HAVING EXTERNAL EXHAUST-GAS RECIRCULATION

FIELD OF THE INVENTION

The invention relates to a method for determining the load signal of an internal combustion engine having external exhaust-gas recirculation (EGR) by means of a pressure sensor mounted in the intake pipe. A load signal is computed in a circuit unit from measured intake pipe pressure and measured rpm. The load signal is proportional to the gas mass inducted per revolution of the crankshaft.

BACKGROUND OF THE INVENTION

A load signal, which is corrected with respect to exhaust-gas recirculation and which is proportional to the fresh air mass inducted per revolution, is needed especially for computing the fuel quantity to be injected. This is so because errors in the corrected load signal lead, inter alia, to errors in the mixture composition and therefore to increased toxic substance emissions.

Methods are known for considering the influence of an exhaust-gas recirculation in a load detection for engine controls of spark-injection engines wherein the load detection is based on intake pipe pressure. In these methods, a corrective factor from a rpm-dependent and load-dependent characteristic field is used to correct the injection time for external exhaust-gas recirculation. However, these methods only provide good results for steady-state conditions and have several disadvantages.

The corrective factor is always dependent upon the operating point of the internal combustion engine, that is, the corrective factor is dependent upon the rpm and the load of the engine with the load being detected, for example, from the angle of the throttle flap. This requires, for example, during an application, a new adaptation of the corrective characteristic field in a complex manner for each change of the exhaust-gas recirculation rate.

Furthermore, the correction of the injection time is only correct during steady-state operation. Dynamic residual errors in the mixture composition are unavoidable especially for changes in the operating point, that is, for changes of the rpm and the load caused by changes of the throttle flap angle. This causes a disadvantageous deterioration of the exhaust-gas values of the engine. Furthermore, such known methods operate only imprecisely when changes of the ambient pressure occur, such as when operating the engine at different elevations. Finally, it is disadvantageous that these methods do not make possible output signals which form the basis for other functions such as the ignition angle correction or a torque interface.

Furthermore, a method for detecting the load signal of an internal combustion engine is known from German published patent application 195 25 815. In this method, the load signal of the engine is corrected in dependence upon intake pipe pressure, exhaust-gas pressure, rpm and from the position of the EGR valve. However, it is disadvantageous in this method that it likewise only correctly operates for steady-state conditions and, furthermore also exhibits residual errors when changes of ambient pressure occur.

SUMMARY OF THE INVENTION

In view of the foregoing, it is an object of the invention to improve upon a method for determining the load signal of an internal combustion engine having external exhaust-gas recirculation in such a manner that, on the one hand, a simple application is possible and especially that the exhaust-gas recirculation rate can be changed at any time without a renewed adaptation of the load signal correction being required and, on the other hand, that even for transient operation a correct load signal is formed and reduced exhaust-gas emissions of the engine are thereby made possible.

The method of the invention is for determining a load signal of an internal combustion engine having an intake pipe, external exhaust-gas recirculation (EGR) and an EGR valve. The method includes the steps of: measuring an intake-pipe pressure (ps) in the intake pipe utilizing a pressure sensor; measuring the speed (n) of the engine in rpm; supplying the intake-pipe pressure (ps) and the speed (n) to a circuit arrangement and computing a load signal (tl) therein proportional to the mass inducted per revolution of the engine; determining the exhaust-gas mass flow flowing through the EGR valve; converting the exhaust-gas mass flow into an rpm-dependent signal; filtering the rpm-dependent signal in a filter simulating charging operations in the intake pipe; determining a corrective signal (scorr) proportional to the exhaust-gas mass inducted by the engine per revolution thereof; and, subtracting the corrective signal (scorr) from the load signal (tl) to generate and output a corrected load signal (tlcorr).

As noted above, the method of the invention provides for the following steps: determining the exhaust-gas mass flowing through the EGR valve; determining a corrective signal, which is proportional to the exhaust-gas mass inducted by the engine per revolution, by converting the specific exhaust-gas mass flow into an rpm-dependent signal; and, filtering this signal in a filter, which simulates intake pipe charging operations; and, subtracting this corrective signal from the load signal to generate a corrected load signal and outputting this signal.

The above steps provide the following advantages:

(i) that a systematic correction of the load signal is possible while considering all essential influence quantities with the load signal being determined on the basis of measured intake pipe pressure;

(ii) that reduced exhaust-gas emissions are possible also for transient operation of the engine because even during changes of the operating point (especially via a filter simulating the filtering in the intake pipe charge operations), a precise load signal is formed; and, (iii) that the exhaust-gas recirculation rate can be changed at any time without it being necessary to have a renewed adaptation of the load signal correction because a load signal correction can be continuously undertaken while considering the exhaust-gas mass flow. This is made possible by the determination of the exhaust-gas mass flow and the conversion into a corrective signal proportional to the exhaust-gas mass inducted per revolution of the engine.

In principle, various embodiments are conceivable for the filter simulating the intake pipe charging operations. However, it is especially advantageous when the filter is a lowpass filter having a rpm-dependent time constant which simulates especially well the intake pipe charging operations.

The determination of the exhaust-gas mass flow through the EGR valve takes place in an especially advantageous manner in dependence upon the position of the EGR valve, the exhaust-gas temperature at the EGR valve, the intake pipe pressure and the exhaust-gas pressure via the outflow function, which is known per se and stored as a characteristic line and which defines the physical advantageous proximity to the determination of the exhaust-gas mass flow.

The sum of the ambient pressure and the exhaust-gas counter pressure is formed to determine the exhaust-gas pressure.

The exhaust-gas counter pressure itself can be detected in various ways. Advantageously, the exhaust-gas counter pressure is, however, taken from an rpm-dependent and load-dependent characteristic field.

The determination of the exhaust-gas temperature at the EGR valve is likewise possible in various ways. An advantageous embodiment provides that the exhaust-gas temperature at the EGR valve is likewise taken from a rpm-dependent and load-dependent characteristic field.

Furthermore, it is advantageously provided that the throughflow through the EGR valve is stored as a characteristic line under normalized conditions (0° C. or 20° C., 1013 mbar input pressure, overcritical pressure ratio). The input quantity of this characteristic line is the position of the EGR valve if an EGR valve having position feedback is used. Furthermore, the drive signal of the EGR valve can be used as an input variable.

It is a special advantage that the method makes possible not only the output of the corrected load signal but also the output of the EGR rate which is formed by the quotient of the corrective signal and the load signal.

BRIEF DESCRIPTION OF THE DRAWINGS

The invention will now be described with reference to the drawings wherein.

DESCRIPTION OF THE PREFERRED EMBODIMENTS OF THE INVENTION

The method of the invention for determining the load signal of an internal combustion engine having external exhaust-gas recirculation by means of a pressure sensor will now be explained with reference to FIG. 1. The pressure sensor is mounted in the intake pipe of the engine.

Figure 1:
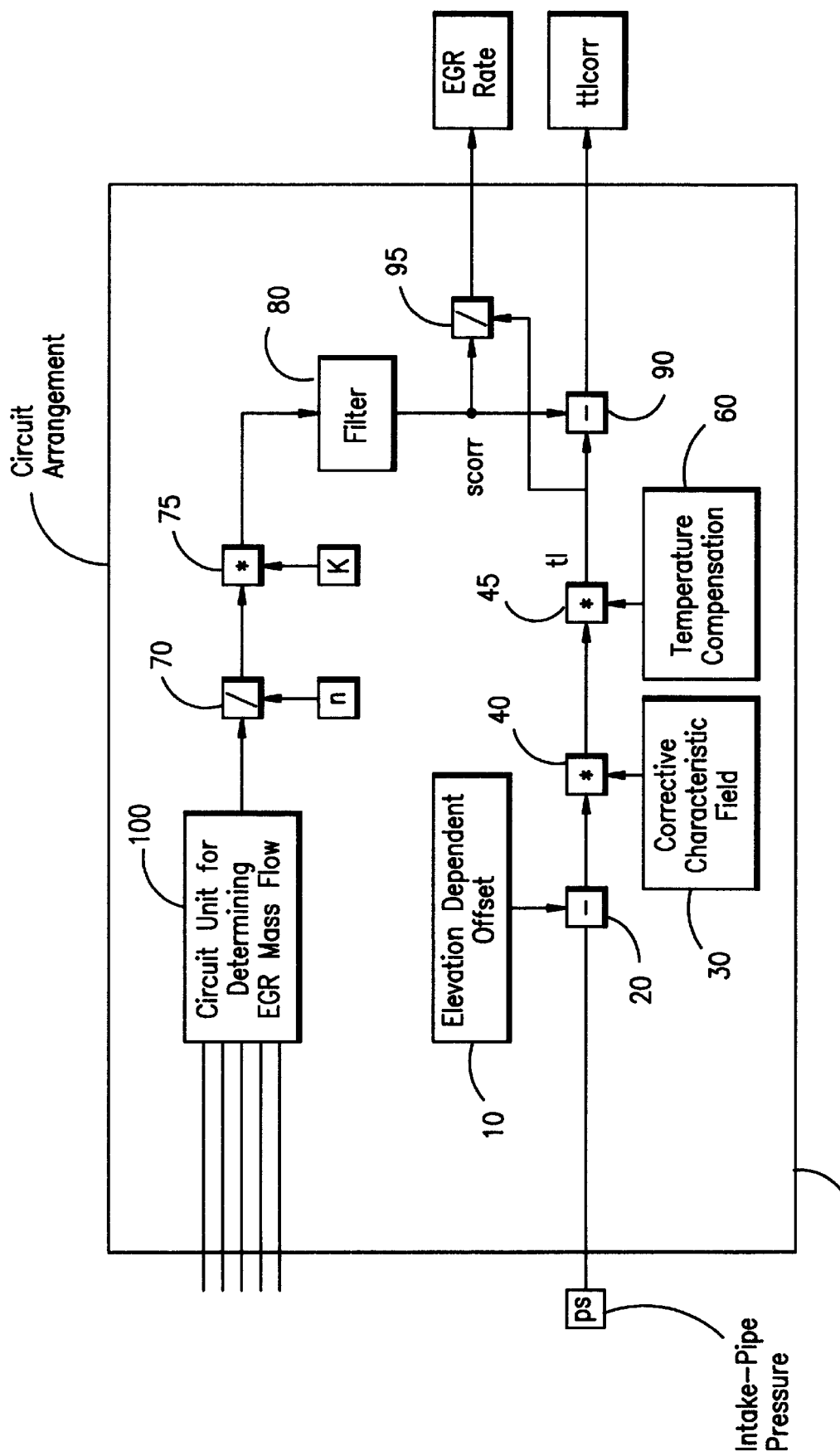
FIG. 1 is a schematic block diagram of an electronic circuit arrangement for realizing the method of the invention; and, FIG. 2 is a detailed block diagram of a part of the circuit arrangement shown in FIG. 1 for determining the EGR mass.

As shown in FIG. 1, the measured intake pipe pressure ps is supplied to a circuit arrangement 1 and is converted into a load signal tl in a manner known per se. This conversion is achieved in that the pressure signal ps is first subjected to a subtraction of an elevation-dependent offset 10 in a subtracting unit 20 and is multiplied by a corrective factor in a multiplier 40 and via multiplication by a temperature-dependent factor 60 in a further multiplier 45. The corrective factor is taken from a corrective characteristic field 30. In order to consider the influence of the exhaust-gas recirculation, the exhaust-gas mass flow through the EGR valve is first determined in a circuit unit 100 from the following: intake pipe pressure ps, exhaust-gas pressure pa, the position of the EGR-valve and a corrective factor dependent upon operating point.

The quotient of the exhaust-gas mass flow and rpm (n) is formed in a divider 70 and a multiplication by a constant K is performed in a multiplier 75. Thereafter, this corrective signal, which corresponds to steady-state conditions, is supplied to a filter 80 which is configured as a lowpass filter having a rpm-dependent time constant. The filter 80 considers intake pipe charge operations, that is, dynamic effects. The corrective signal scorr outputted by the filter 80 is then subtracted from the load signal tl in a subtracting unit 90. A corrected load signal tlcorr results and is outputted.

Furthermore, the EGR rate can be determined and outputted by forming the quotient of corrective signal scorr and load signal tl in a divider unit 95. This EGR rate can be used as an input quantity for further functions of the control of the engine, inter alia, for determining the torque, the optimal ignition angle or the temperatures in the intake pipe.

Figure 2:
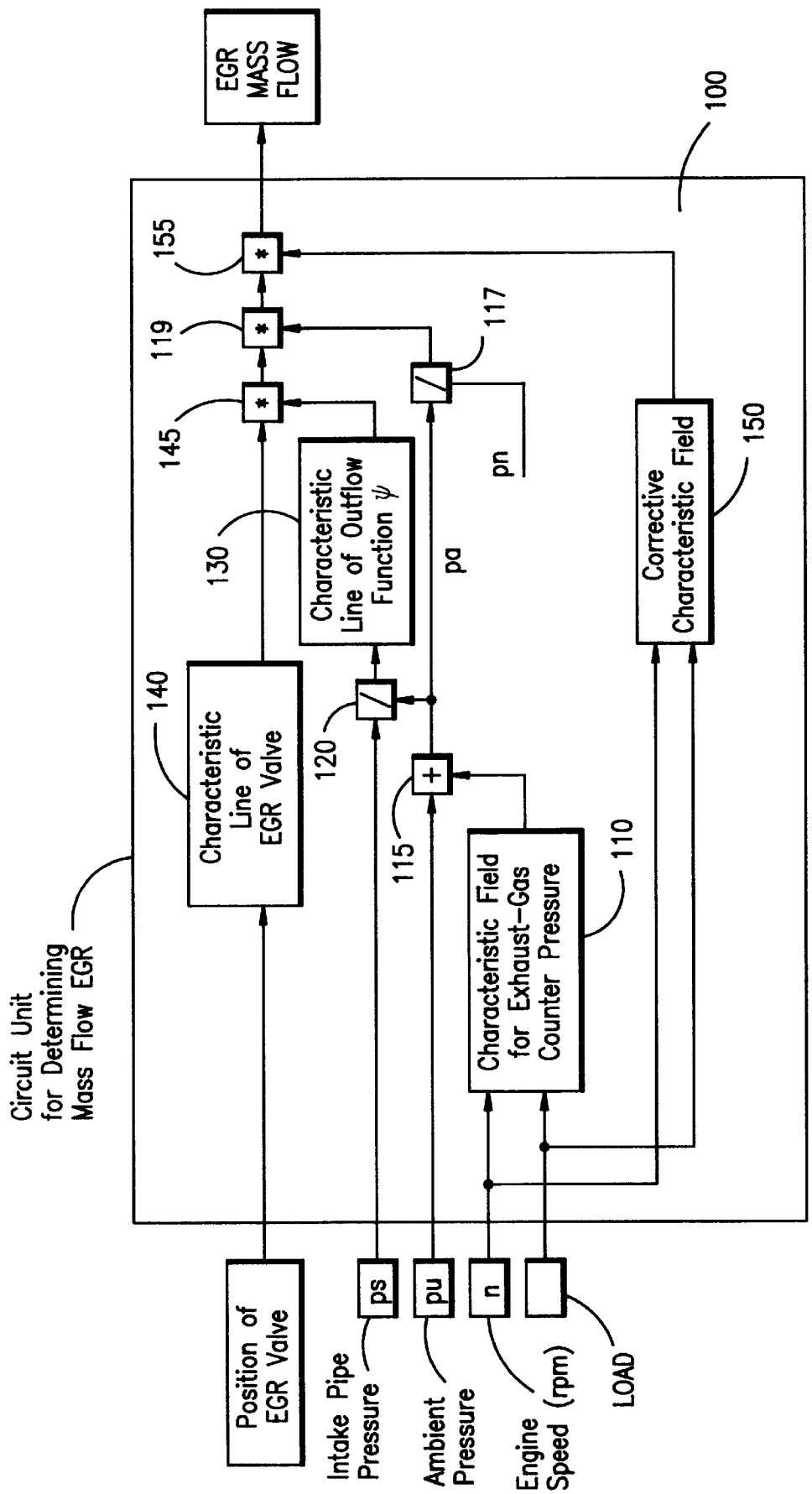

The determination of the exhaust-gas mass flow, which flows through the EGR valve, is explained with respect to FIG. 2 below. FIG. 2 is a detail view of the circuit unit 100 shown in FIG. 1.

The EGR mass flow is determined from the following: the position of the EGR valve, the intake pipe pressure ps, the ambient pressure pu, the rpm (n) as well as a load-dependent quantity identified as LOAD. The load-dependent quantity can, for example, be the throttle flap angle.

The exhaust-gas pressure pa is determined in an adder 115 from the ambient pressure pu and the exhaust-gas counter pressure which is taken from an rpm-dependent and load-dependent characteristic field 110. The exhaust-gas pressure pa is supplied to a divider 120 wherein the quotient of the intake pipe pressure ps and the exhaust-gas pressure pa is formed. This quotient is supplied to a circuit unit 130 wherein the characteristic line of the outflow function ψ is stored which best approximates the flow conditions at the EGR valve in dependence upon intake pipe pressure ps and exhaust-gas pressure pa.

The signal outputted by the circuit unit 130 is multiplied by a signal which is outputted from a circuit unit 140 wherein the characteristic line of the EGR valve is realized in dependence upon the position of the EGR valve. This multiplication takes place in a multiplier 145. The signal outputted by the multiplier in multiplier 119 145 is, in turn, multiplied by a normalized signal of the quotient of the exhaust-gas pressure pa and a normalized pressure pn which is generated in a divider 117.

To consider the exhaust-gas temperature at the EGR valve, this signal is multiplied by a signal in a further multiplier 155. This signal is taken from an rpm-dependent and load-dependent characteristic field 150 to consider all influences which act multiplicatively and are dependent from the operating point.

The method described makes possible a systematic correction of the load signal for an external exhaust-gas recirculation while considering all essential influence quantities. The load signal is determined on the basis of the measured intake pipe pressure. The filter 80 simulates the charging operations in the intake pipe. Because of the filter 80, reduced exhaust-gas emissions are possible for internal combustion engines operated in a transient state. This is so because a correct load signal tl is always formed even during changes of operating point.

Furthermore, the EGR rate can be changed at any time without a renewed adaptation of the load signal correction being required for an application.

Finally, and to an extent as a by-product, the computed EGR rate is outputted which can be used as input quantity for additional functions of the control of the engine, for example, for determining the torque, the optimal ignition angle or the temperature in the intake pipe.

It is understood that the foregoing description is that of the preferred embodiments of the invention and that various changes and modifications may be made thereto without departing from the spirit and scope of the invention as defined in the appended claims.

What is claimed is:

1. A method for determining a load signal of an internal combustion engine having an intake pipe and operating at a speed (n), an external exhaust-gas recirculation (EGR) and an EGR valve through which an exhaust gas mass flow flows from the engine, the engine inducting a mass of fresh gas and exhaust ass per revolution thereof, and said EGR valve assuming a position between fully shut and fully open, the method comprising the steps of:

measuring an intake-pipe pressure (ps) in said intake pipe utilizing a pressure sensor;

measuring said speed (n) of said engine in rpm;

supplying said intake-pipe pressure (ps) and said speed (n) to a circuit arrangement and computing a load signal (tl) therein proportional to said mass inducted per revolution of said engine;

determining said exhaust-gas mass flow flowing through said EGR valve;

converting said exhaust-gas mass flow into an rpm-dependent signal;

filtering said rpm-dependent signal in a filter simulating charging operations in said intake pipe;

determining a corrective signal (scorr) proportional to the exhaust-gas mass inducted by said engine per revolution thereof; and, subtracting said corrective signal (scorr) from said load signal (tl) to generate and output a corrected load signal (tlcorr).

2. The method of claim 1, wherein said filter is a lowpass filter having an rpm-dependent time constant.

3. A method for determining a load signal of an internal combustion engine having an intake pipe and operating at a speed (n) an external exhaust gas recirculation (EGR) and an EGR valve through which an exhaust gas mass flow flows from the engine, the engine inducting a mass of fresh gas and exhaust gas per revolution thereof, and said EGR valve assuming a position between fully shut and fully open, the method comprising the steps of:

measuring an intake-pipe pressure (ps) in said intake pipe utilizing a pressure sensor;

measuring said speed (n) of said engine in rpm;

supplying said intake-pipe Pressure (ps) and said speed (n) to a circuit arrangement and computing a load signal (tl) therein proportional to said mass inducted per revolution of said engine;

determining said exhaust-gas mass flow flowing through said EGR valve;

converting said exhaust-gas mass flow into an rpm-dependent signal;

filtering said rpm-dependent signal in a filter simulating charging operations in said intake pipe;

determining corrective signal (scorr) proportional to the exhaust-gas mass inducted by said engine per revolution thereof;

subtracting said corrective signal (scorr) from said load signal (tl) to generate and output a corrected load signal (tlcorr);

detecting the position of said EGR valve;

detecting the temperature of the exhaust gas at said EGR valve;

determining an exhaust-gas pressure (pa);

providing an outflow function ($\psi$) stored as a characteristic line; and, carrying out said step of determining said exhaust-gas mass flow in dependence upon: said position of said EGR valve, said exhaust-gas temperature at said EGR valve, said intake-pipe pressure (ps); and, said exhaust-gas pressure (pa) utilizing said outflow function ($\psi$).

4. The method of claim 3, wherein a characteristic field Provides an exhaust-gas counter pressures and said exhaust gas has an exhaust-gas pressure (pa) which is determined by forming a sum of the ambient pressure (pu) and the exhaust-gas counter pressure from said characteristic field.

5. The method of claim 4, wherein said exhaust-gas counter pressure is taken from an rpm-dependent and load-dependent characteristic field.

6. The method of claim 3, wherein said exhaust-gas temperature at said EGR valve is taken from an rpm-dependent and load-dependent characteristic field.

7. The method of claim 3, wherein said EGR valve has a through-flow behavior and said through-flow behavior under normal conditions of said EGR valve is stored in a characteristic line.

8. The method of claim 1, wherein a quotient of the corrective signal (scorr) and said load signal (tl) is formed and outputted for a determination of the EGR rate.

* * * * *

UNITED STATES PATENT AND TRADEMARK OFFICE
CERTIFICATE OF CORRECTION

PATENT NO. : 5,889,203
DATED : March 30, 1999
INVENTOR(S) : Ernst Wild, Manfred Pfitz and Axel Stuber It is certified that error appears in the above-identified patent and that said Letters Patent is hereby corrected as shown below:

On the cover page, under "FOREIGN PATENT DOCUMENTS": delete "195 28 815" and substitute -- 195 25 815 -- therefor.

In column 4, line 39: delete "in multiplier 119".

In column 4, line 40: between "multiplied" and "by", insert -- in multiplier 119 --.

In column 5, line 10: delete "ass" and substitute -- gas -- therefor.

In column 5, line 38: after (n), insert a comma.

In column 5, line 38: delete "exhaust gas" and substitute -- exhaust-gas -- therefor.

In column 5, line 47: delete "Pressure" and substitute -- pressure -- therefor.

In column 6, line 10: between "determining" and "corrective", insert -- a --.

UNITED STATES PATENT AND TRADEMARK OFFICE
CERTIFICATE OF CORRECTION

PATENT NO. : 5,889,203
DATED : March 30, 1999
INVENTOR(S) : Ernst Wild, Manfred Pfitz and Axel Stuber It is certified that error appears in the above-identified patent and that said Letters Patent is hereby corrected as shown below:

```
    In column 6, line 30:  delete "Provides" and substitute
-- provides -- therefor.

In column 6, line 30:  delete "pressures" and substitute
-- pressure; -- therefor.
```

Signed and Sealed this

Eighth Day of May, 2001

NICHOLAS P. GODICI

*Attest:*

*Attesting Officer*   Acting Director of the United States Patent and Trademark Office